United States Patent
Ko et al.

Patent Number: 6,040,390
Date of Patent: Mar. 21, 2000

[54] PROCESS FOR HYDROGENATING CONJUGATED DIENE POLYMERS

[75] Inventors: Young-Hoon Ko; Jung-Goo Lee; Jae-Yoon Kim, all of Taejeon, Rep. of Korea

[73] Assignee: Korea Kumho Petrochemical Co., Ltd., Seoul, Rep. of Korea

[21] Appl. No.: 09/119,340

[22] Filed: Jul. 20, 1998

[30] Foreign Application Priority Data

Mar. 4, 1998 [KR] Rep. of Korea .......................... 98-7016

[51] Int. Cl.$^7$ ....................................................... C08F 8/04
[52] U.S. Cl. ................... 525/338; 525/332.8; 525/332.9; 525/333.1; 525/333.2; 525/339
[58] Field of Search ...................... 525/338, 334

[56] References Cited

U.S. PATENT DOCUMENTS

| | | | |
|---|---|---|---|
| 5,039,755 | 8/1991 | Chamberlain et al. | 525/338 |
| 5,583,185 | 12/1996 | Ferrer et al. | 525/338 |
| 5,817,877 | 10/1998 | Hartwig et al. | 525/338 |

*Primary Examiner*—Bernard Lipman
*Attorney, Agent, or Firm*—Davidson, Davidson & Kappel, LLC

[57] ABSTRACT

This invention relates to a process for hydrogenating selectively the unsaturated double bonds of copolymer having the double bonds of conjugated diene unit, which has been widely used as a modifier of transparent impact-resistant resin or polyolefin, and polystyrene resin. According to this invention, the copolymer is saturated via hydrogenation in the presence of a novel homogeneous system organotitanium catalyst without a separate reducing agent, thus representing an extremely high hydrogenation yield with remarkable hydrogenation reproducibility. Hence, a compound represented by the following formula I is employed as an appropriate catalyst.

Formula I

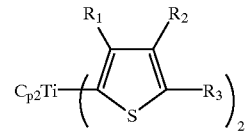

Wherein Cp is a cyclopentadienyl ($C_5H_5$) group;
$R_1$, $R_2$ and $R_3$ are hydrogen atom or alkyl group of 1 to 3 carbon atoms; and
$R_1$, $R_2$ and $R_3$ can be the same or different.

7 Claims, No Drawings

PROCESS FOR HYDROGENATING CONJUGATED DIENE POLYMERS

BACKGROUND OF THE INVENTION

This invention relates to a process for hydrogenating conjugated diene polymers and more particularly, to the process for hydrogenating the unsaturated double bonds of the diene units of conjugated diene polymer, wherein the unsaturated double bonds of conjugated diene polymers, which has been widely used as a modifier for transparent impact-resistant resin or polyolefin and polystyrene resin, is saturated via hydrogenation in the presence of a novel homogeneous catalyst of the organotitanium in the absence of a separate reducing agent, thus representing a high hydrogenation yield with a good reaction reproducibility.

Some polymers of conjugated diene such as 1,3-butadiene or isoprene, have been widely applicable as an elastomer in the industrial field, together with copolymers formulated by these conjugated dienes and copolymerization-possible aromatic vinyl monomers(e.g., styrene, etc.). Since these polymers have a double bonds within their internal chain, their vulcanization is made available but with poor durability and poor resistance to oxidation.

The conjugated diene-aromatic vinyl monomer block copolymers which are not vulcanized, have been as thermoplastic elastomer used for a transparent impact-resistant resin, or for a modifier for polyolefin and polystyrene resin. However, the double bonds in these copolymers are concerned directly with poor durability and poor resistance against oxygen and ozone in the air.

Under such situation, these copolymers need to be used within limited scope of application, while not being exposed to the external environment.

To overcome the shortcomings as aforementioned, a method designed to improve the durability and oxidative resistance of these polymers is to hydrogenate the internal double bonds for saturation in part or whole.

In polymers with the olefinical double bonds, the method of adding hydrogen to the internal double bonds is generally classified into the following two types: (a)a method of using heterogeneous catalysts, and (b)a method of using homogeneous catalyst belonging to Ziegler type catalyst or the organometallic compounds such as Rh and Ti.

According to the hydrogenation of using the heterogeneous catalyst, the olefinic polymers are dissolved in an appropriate solvent and then, contacted with hydrogen in the presence of a heterogeneous catalyst. However, shch method has recognized some disadvantages in that (a) due to adverse factors such as steric hindrance of polymers and relatively high viscosity, the contact may not be easily made between the reactant and catalyst, and (b) if hydrogenation is successfully achieved due to strong adsorption of both the polymer and catalyst, their not easily detachable bonding characteristics make other unhydrogenated polymers extremely difficult to reach the activated point.

The complete addition of hydrogen to the double bonds in the case of the heterogeneous catalyst should require a large volume of catalyst including severe conditions such as high temperature and high pressure, which may result in degradation of polymer and gelation as well. In particular, in case of copolymers comprising conjugated dienes and aromatic vinyl mononers, the saturation of the double bonds in an aromatic compound is simultaneously performed, which makes it difficult to selectively hydrogenate the double bonds of olefinic polymer only.

In addition, physical separation of the residual catalyst from the resulting polymer solution after hydrogenation would be extremely difficult, and a part of heterogeneous catalyst is strongly absorbed to the polymer, whereby its removal is not completely made available.

In contrast to the hydrogenation of using heterogeneous system catalyst, a hydrogenation designed to use a homogeneous catalyst is characterized in that (a) catalytic activity is high, and (b) with less amounts of catalyst, hydrogenation can be made available with higher yield under a mild conditions, i.e., low-temperature and low-pressure.

On top of that, if the homogeneous catalyst is used, its advantage is to selectively hydrogenate the olefinic double bonds only among the chains of copolymer consisting of aromatic vinyl hydrocarbon and conjugated dienes under appropriate hydrogenation conditions.

Notwithstanding this, hydrogenation of the unsaturated double bonds using the homogeneous catalyst is responsible for lowering the stability of catalyst itself, and the separation of the deactivated catalyst from hydrogenated polymers becomes extremely difficult.

Meantime, several hydrogenations or selective hydrogenation involved in the conjugated diene polymers were disclosed in the prior arts. For example, in order to hydrogenate or selectively hydrogenate the polymer containing an ethylenically unsaturated double bonds, or the polymer having aromatic and ethylenically unsaturated double bonds, the methods of using appropriate catalysts published in the prior arts, preferably some catalysts containing 8-, 9- and 10-group metals or precursor of catalysts, were disclosed in the U.S. Pat. No. 3,494,942, No. 3,634,594, No. 3,670,054, and No. 3,700,633.

According to these methods, the catalyst includes 9- and 10-group metals, especially some catalyst prepared by nickel or cobalt compounds in combination with an appropriate reducing agent such as alkyl aluminium. The prior arts disclosed that in addition to alkyl aluminium, 1-, 2- and 13-group metals in the Periodic Table of the Elements, especially lithium, magnesium and aluminium alkyl or hydride, might be used as an effective reducing agent. In general, the blending ratio of both 1-, 2- and 13-group metals and 8-, 9- and 10-group metals is in the molar ratio of 0.1:1 to 20:1, preferably in the molar ratio of 1:1 to 10:1.

The U.S. Pat. No. 4,501,857 has also disclosed that via hydrogenation of conjugated diene polymer in the presence of one bis(cyclopentadienyl)titanium compound at least and one hydrocarbon lithium compound at least, the double bonds within the polymer may be selectively hydrogenated.

Further, the U.S. Pat. No. 4,980,421 has also disclosed that pseudo-hydrogenation activity may develop via combination of alkoxy lithium compound with bis(cyclopentadienyl) titanium compound, which may be directly added or as a mixed form of organolithium compound and alcoholic or phenolic compound. This invention has reported that the catalytic activity was quite effective even less catalyst used and the residual amount of catalyst did not reversely affect the stability of hydrogenated polymer formed after hydrogenation Another hydrogenation process using bis(cyclopentadienyl)titanium diaryl compound as bis(cyclopentadienyl)titanium compound was disclosed in the U.S. Pat. No. 4,673,714. According to this invention, the unsaturated double bonds of conjugated diene were hydrogenated in the absence of hydrocarbon lithium compound.

Further, there was another process of hydrogenating a conjugated diene polymer including generation of a living polymer via polymerization or copolymerization of conjugated diene monomer as an initiator of organo-alkalimetal polymerization in the presence of an appropriate solvent, which was disclosed in the U.S. Pat. No. 5,039,755. According to this invention, the polymerization of the living polymer, so formed, is terminated with the addition of hydrogen. From a conjugated diene unit of terminated polymer, the selective hydrogenation of the double bonds was carried out via a catalyst expressed by $(C_5H_5)_2TiR_2$ (wherein R is a arylalkyl group).

Another method of hydrogenating the double bonds of conjugated diene was disclosed in the U.S. Pat. No. 5,583,185 via use of a catalyst represented by $(C_5H_5)_2Ti(PhOR)_2$ or $(C_5H_5)_2TiR_2$ as a homogeneous system catalyst.

However, the hydrogenation activity of such homogeneous system catalysts differs greatly depending on the reduced state of catalyst and then, the reproducibility of hydrogenation may be lowered. Thus, a high-yield hydrogenated polymer with high reproducibility cannot be easily obtained.

Further, when the reaction is being carried out, there is a trend that some active ingredients of catalyst is contaminated into the inactive ones by the impurities. This is liable to lower the hydrogenation activity which may result in poor reaction reproducibility.

In the homogeneous catalyst, the hydrogenation yield is significantly affected by the stability of catalyst during the hydrogenation process.

Therefore, hydrogenation of a polymer based on the homogeneous catalyst has encountered a lot of problems, when applied to the industrial scale.

Under such situation, the implementation of more economical hydrogenation process should require more effective, high-active and stable catalyst with less amount than the conventional homogeneous system catalysts. Further, a novel catalyst needs to be made available so as to avoid any complicated process to remove catalyst residues from the hydrogenated polymer after reaction.

SUMMARY OF THE INVENTION

An object of this invention is to provide a process of hydrogenating conjugated diene polymers using a catalyst synthesized by bis(cyclopentadienyl)titanium compound and thiophene compound so as to produce a hydrogenated polymer with high hydrogenation yield and remarkable reproducibility, without problems the conventional homogeneous catalysts have faced.

To achieve the above object, the process for hydrogenating a conjugated diene polymers according to this invention is characterized in that a homopolymer of conjugated diene monomer, or a conjugated dine monomer-aromatic vinyl monomer copolymer, is hydrogenated under the presence of a novel catalyst represented by the following formula I.
Formula I.

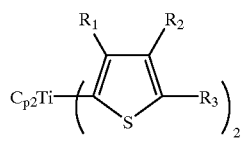

Wherein Cp is a cyclopentadienyl ($C_5H_5$) group;
$R_1$, $R_2$ and $R_3$ are hydrogen atom or alkyl group of 1 to 3 carbon atoms; and
$R_1$, $R_2$ and $R_3$ can be the same or different.

DETAILED DESCRIPTION OF PREFERRED EMBODIMENTS

This invention is explained in more detail as set forth hereunder.

This invention relates to the process for hydrogenating a conjugated diene polymer in the presence of a catalyst formulated by bis(cyclopentadienyl)titanium compound and thiophene compound. The catalyst used for this invention is a compound represented by the above formula I. The above compound may be used by selecting one or more compounds from the following groups:

bis(cyclopentadienyl)-bis(thienyl)titanium,
bis(cyclopentadienyl)-bis(4-methyl thienyl)titanium,
bis(cyclopentadienyl)-bis(3-methyl thienyl)titanium,
bis(cyclopentadienyl)-bis(2, 4-dimethyl thienyl)titanium,
bis(cyclopentadienyl)-bis(4-ethyl thienyl)titanium,
bis(cyclopentadienyl)-bis(3-ethyl thienyl)titanium and,
bis(cyclopentadienyl)-bis(2,4-diethyl thienyl)titanium, The hydrogenation catalyst of this invention can be synthesized in accordance with the method published in the existing literature (Zh. Obshch. khim. 1982, 52(7), 1571–5).

Meantime, it is preferred that the amount of the hydrogenation catalyst used for this invention is in the range of 0.05 to 5 mmol per 100 g of polymer, more preferably in the range of 0.1 to 2 mmol per 100 g of polymer.

If the amount of the hydrogenation catalyst used for this invention is less than 0.05 mmol, the hydrogenation rate of conjugated diene is not significantly high; in case of exceeding 5 mmol, its excessive use is deemed uneconomical, even though the hydrogenation yield is significantly high.

It is preferred that the molecular weight of a polymer is about 500 to 1,000,000, when it is hydrogenated in the presence of a hydrogenation catalyst of this invention. The selective hydrogenation of unsaturated double bonds in the following polymers is available: a homopolymer of conjugated diene monomer, or a copolymer consisting of conjugated diene monomer and copolymerization-possible vinyl-substituted aromatic monomer, or conjugated diene units of random or block copolymer.

As already reported, some polymers containing ethylenically unsaturated double bonds and optional aromatic unsaturated double bonds, may be synthesized by polymerizing one or more polyolefins, especially diolefin individually, or by copolymerizing one or more alkenyl aromatic hydrocarbon monomers. The copolymer is linear, star or radial types including random, tapered, block or combination thereof.

In case of a copolymer containing ethylenically unsaturated double bonds, or a copolymer containing both aromatic unsaturated double bonds and ethylenically unsaturated double bonds, its preparation may be available using anionic initiator such as organolithium compound or polymerization catalyst.

The above polymer may be synthesized via commonly available bulk polymerization, solution polymerization, or emulsion polymerization.

The conjugated dienes, which can be polymerized in an anionic type, includes the ones of 4 to 12 carbon atoms such as 1,3-butadiene, isoprene, piperylene, phenylbutadiene, 3,4-dimethyl-1,3-hexadiene and 4,5-diethyl-1,3-octadiene. It is preferred to use a conjugated diolefin of 4 to 9 carbon atoms.

The alkenyl aromatic hydrocarbon compounds, which can be copolymerized with the conjugated dienes, include styrene, styrene substituted with various alkyl groups, alkoxy substituted styrene, 2-vinyl pyridine, 4-vinyl pyridine, vinyl naphthalene, and vinyl aryl compound such naphthalene substituted with various alkyl groups.

In hydrogenating these copolymers, it is preferred to carry out the hydrogenation in such a manner that a living polymer solution, so formed via polymerization of these conjugated dienes in inert solvents, is subject to hydrogenation as it is and then, is continuously performed.

Hence, an "inert solvent" means the one which is not reacted with any reactants obtained from the polymerization or hydrogenation. Such inert solvent includes the following: aliphatic hydrocarbons such as n-pentane, n-hexane, n-hepane and n-octane; aliphatic-cyclic hydrocarbons such as cyclohexane and cycloheptane; ethers such as diethylether and tetrahydrofuran. The above solvent may be employed in a single or mixed form. Further, aromatic hydrocarbons(e.g., benzene, toluene, xylene, and ethylbenzene) may be also applicable unless it hydrogenates the aromatic double bonds under predetermined hydrogenation conditions.

The hydrogenation of this invention is performed, when the content of the living polymer is in the range of 1 to 50% by the weight to a solvent, preferably in the range of 5 to 25% by the weight.

Meantime, the hydrogenation of this invention is performed in such a manner that the polymer solution is maintained at constant temperature under hydrogen or inert atmosphere and then, a hydrogenation catalyst represented by the formula I is added to the polymer in a stirred or unstirred state, and followed by input of hydrogen gas under constant pressure.

Hence, helium, nitrogen, or argon is used for inert atmosphere. These gases are not reacted with any reactants produced from the hydrogenation; since air or oxygen, which oxidizes or degrades the catalyst, induces the reduction of its activity such gas is not preferred for use.

In line with the hydrogenation of this invention, the reaction temperature is generally in the range of 0 to 150° C. If the hydrogenation temperature is lower than 0° C., the hydrogen process proves to be uneconomical in that the reduced catalytic activity including slower hydrogenation rate requires a large amount of catalyst. Further, the insolubility of the hydrogenated polymer may easily induce the precipitation of polymer. By contrast, if the hydrogenation temperature is higher than 150° C., this may result in reducing the catalytic activity and inducing the gelation or degrading the polymer. Further, with the addition of hydrogen to aromatic double bonds, the selectivity of hydrogenation is liable to be reduced. Therefore, the preferred reaction temperature is in the range of 50 to 140° C.

The pressure of hydrogen used in the hydrogenation is not specifically limited but an appropriate pressure of hydrogen is in the range of 1 to 100 kg.f/cm$^2$. If the pressure is lower than 1 kg.f/cm$^2$, the hydrogenation rate becomes slow and in case of higher than 100 kg.f/cm$^2$, unnecessary gelation is actually induced.

Therefore, it is preferred to maintain the pressure of hydrogen in the range of 2 to 30 kg.f/cm$^2$. In a correlation with hydrogenation conditions such as catalyst amounts, an optimal pressure of hydrogen is selected. Actually, it is preferred that when the amount of hydrogenation catalyst is small, the pressure of hydrogen should be high.

Meantime, as for the hydrogenation of this invention, the hydrogenation time is generally several seconds to 100 hours. The hydrogenation time may be properly selected in the above range, in the same manner as do in any reaction conditions.

According to this invention, either batch or continuous-type hydrogenation may be used.

The hydrogenation may be monitored by examining the hydrogen absorption amount.

When the unsaturated double bonds of conjugated diene polymer is hydrogenated in the presence of a hydrogenation catalyst according to this invention, more than 50% of unsaturated double bonds may be hydrogenated in a conjugated diene unit of polymer; preferably, more than 90% of unsaturated double bonds may be achieved.

More preferably, if a copolymer consisting of conjugated dienes and vinyl-substituted aromatic hydrocarbons is hydrogenated, more than 90% of hydrogenation yield may be obtained on the unsaturated double bonds of conjugated diene unit and at the same time, a hydrogenated copolymer having less than 5% hydrogenation yield in aromatic double bonds may selectively be attained.

This invention is explained in more detail by the following examples as set forth hereunder but is not limited by these examples.

PREPARATION EXAMPLE 1

Synthesis of bis(cyclopentadienyl)-bis(thienyl)titanium catalyst

A mixture of 2.5 g of 10 mmol titanocendichloride (Cp$_2$TiCl$_2$) and 50 ml of tetrahydrofuran was charged to a 200 ml schienk reactor under inert gas atmosphere and the temperature was lowered to −10° C., while stirring the mixture.

20 mmol of thienyl lithium solution(in 1.0M tetrahydrofliran solution)was added slowly to the mixture and reacted for 30 minutes, while stirring it at −10° C.

Then, the solution was left at room temperature for 1 hour, and solvents were removed using a vacuum pump. With the addition of diethyl ether, the solid residues in the reactor were dissolved for filtration thereof.

The ether solution was dried using the vacuum pump to obtain a red solid as a final product.

This product was analyzed using $^1$H-NMR. Yield: 80%;. $^1$H-NMR(CDCl$_3$) δ(ppm):6.44(C$_5$H$_5$,5H,s), 6.66(2H,d), 6.87(2H,d,d), 7.35(2H,d)

PREPARATION EXAMPLE 2

Synthesis of styrene-butadiene-styrene block copolymer 4,800 g of cyclohexane was charged to a 10 l autoclave and with the addition of 11 g of tetrahydrofuran, 124 g of styrene monomer and 16 mmol of n-butyl lithium, the mixture was under polymerization for 30 minutes.

Then, 552 g of 1,3-butadiene monomer was added to the reactor to polymerize the mixture for 1 hour.

Finally following the addition of 124 g of styrene monomer, the mixture was polymerized for 30 minutes to obtain a styrene-butadiene-styrene block copolymer with the following properties: combined styrene content: 31.0% (block styrene content: 30.0%): combined 1,2-vinyl content as butadiene unit: 38.5%(26.6% to total polymer): number-average molecular weight: about 50,000.

PREPARATION EXAMPLE 3

Synthesis of styrene-butadiene-styrene block copolymer 4,800 g of cyclohexane was charged to a 10 l autoclave and with the addition of 11 g of tetrahydrofuran, 124 g of styrene monomer and 13.3 mmol of n-butyl lithium, the mixture was under polymerization for 30 minutes. Then, 552 g of 1,3-butadiene monomer was added to the reactor to polymerize the mixture for 1 hour.

Finally, following the addition of 124 g of styrene monomer, the mixture was polymerized for 30 minutes to obtain a styrene-butadiene-styrene block copolymer with the following properties: combined styrene content: 30.9%

(block styrene content: 30.0%): combined 1,2-vinyl content as butadiene unit: 38.2%(26.4% to total polymer); number-average molecular weight: about 60,000.

PREPARATION EXAMPLE 4

Synthesis of styrene-butadiene-styrene block copolymer 4,800 g of cyclohexane was charged to a 10 l autoclave and with the addition of 11 g of tetrahydrofuran, 124 g of styrene monomer and 20.0 mmol of n-butyl lithium, the mixture was under polymerization for 30 minutes. Then, 552 g of 1,3-butadiene monomer was added to the reactor to polymerize the mixture for 1 hour.

Finally, following the addition of 124 g of styrene monomer, the mixture was polymerized for 30 minutes to obtain a styrene-butadiene-styrene block copolymer with the following properties: combined styrene content: 30.7% (block styrene content: 29.9%): combined 1,2-vinyl content as butadiene unit: 39.0%(26.9% to total polymer): number-average molecular weight: about 40,000.

PREPARATION EXAMPLE 5

Synthesis of conjugated diene homopolymer

A mixture of 4,800 g of cyclohexane and 800 g of 1,3-butadiene monomer was charged to 10 l autoclave and with the addition of 20.0 mmol of n-butyl lithium, the mixture was under polymerization for 1 hour. After 1-hour reaction was completed, a butadiene polymer was obtained with the following properties: combined 1,2-vinyl content as butadiene unit: 14.0%, cis content: 35.0%, and number-average molecular weight: about 40,000.

EXAMPLE 1

2,800 g of the solution, containing 400 g of the polymer obtained from the preparation example 2, was charged to a 5 l autoclave and heated to 60 l under stirring.

Then, 1.6 mmol of the catalyst obtained from the preparation example 1 was added to the polymer solution and under 10 kg.f/cm$^2$ of pressure, hydrogenation was continued for 60 minutes.

After the reaction was completed, the reactor was cooled, and the pressure was lowered to atmospheric pressure. The reacting solution was added to methanol to precipitate the polymer.

$^1$H-NMR analysis on hydrogenated polymer, so obtained shows that the final hydrogenation yield on butadiene unit was 90.4%, while no hydrogenation on styrene unit was observed.

EXAMPLE 2

2,800 g of the solution, containing 400 g of the polymer obtained from the preparation example 3, was charged to a 5 l outoclave and heated at 400 rpm at 60° C. Then, 2.0 mmol of the catalyst obtained from the preparation example 1 was added to the polymer solution and under 10 kg.f/cm$^2$ of pressure of hydrogen, hydrogenation was continued for 60 minutes.

After the reaction was completed, the reactor was cooled, and the pressure was lowered to atmospheric pressure. The reacting solution was added to methanol to precipitate the polymer.

$^1$H-NMR analysis on hydrogenated polymer, so obtained shows that the final hydrogenation on styrene unit was observed.

EXAMPLE 3

2,800 g of the solution, containing 400 g of the polymer obtained from the preparation example 4, was charged to a 1 l autoclave and heated at 400 rpm at 60° C. Then, 2.0 mmol of the catalyst obtained from the preparation example 1 was added to the polymer solution and under 15 kg.f/cm$^2$ of pressure of hydrogen, hydrogenation was continued for 60 minutes.

After the reaction was completed, the reactor was cooled, and the pressure was lowered to atmospheric pressure. The reacting solution was added to methanol to precipitate the polymer.

$^1$H-NMR analysis on hydrogenated polymer, so obtained shows that the final hydrogenation rate on butadiene unit was 99.2%, while no hydrogenation on styrene unit was observed.

EXAMPLE 4

2,800 g of the solution, containing 400 g of the polymer obtained from the preparation example 5, was charged to a 1 l autoclave and heated at 400 rpm at 60° C. Then, 4.0 mmol of the catalyst obtained from the preparation example 1 was added to the polymer solution and under 15 kg.f/cm$^2$ of pressure of hydrogen, hydrogenation was continued for 90 minutes.

After the reaction was completed, the reactor was cooled, and the pressure was lowered to atmospheric pressure. The reacting solution was added to methanol to precipitate the polymer.

$^1$H-NMR analysis on hydrogenated polymer, so obtained shows that the final hydrogenation rate on butadiene unit was 98.1%.

COMPARATIVE EXAMPLE 1

2,800 g of the solution, containing 400 g of the polymer obtained from the preparation example 4, was charged to a 1 l autoclave and heated at 400 rpm at 60° C.

2.0 mmol of Cp$_2$TiCl$_2$, a catalyst which was disclosed in the U.S. Pat. No. 4,501,857, was added to the polymer solution together with 10 mmol of n-butyl lithium. Under 1 kg.f/cm$^2$ of pressure of hydrogen, hydrogenation was continued for 60 minutes.

After the reaction was completed, the reactor was cooled, and the pressure was lowered to atmospheric pressure. The reacting solution was added to methanol to precipitate the polymer.

$^1$H-NMR analysis on hydrogenated polymer, so obtained shows that the final hydrogenation rate on butadiene unit was 85.2%, while no hydrogenation on styrene unit was observed.

As mentioned in the above, this invention has the following several advantages: (a) the hydrogenation is made available under a mild condition in the presence of a high-active catalyst; (b) in particular, in line with a copolymer consisting of conjugated diene and vinyl-substituted aromatic hydrocarbon, highly selective hydrogenation may be made available on the unsaturated double bonds of conjugated diene unit; (c) since conjugated diene polymer is used as raw material in this invention, continual hydrogenation in a same reactor may be attained and at the same time, the polymer represents extremely high activity with the addition of catalyst in a small amount, and; (d) since the hydrogenation may be performed economically and easily without catalyst removal process following hydrogenation, the process of this invention is highly effective in the industrial field.

What is claimed is:

1. Process for hydrogenating a conjugated diene polymers, herein a homopolymer of conjugated diene monomer, or a copolymer consisting of conjugated diene monomer and aromatic vinyl monomer, is hydrogenated under the presence of a novel catalyst represented by the following formula I, Formula I

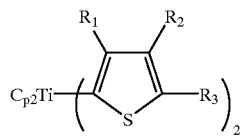

Wherein Cp is a cyclopentadienyl ($C_5H_5$) group;

$R_1$, $R_2$ and $R_3$ can be the same or different.

2. A process according to claim 1, wherein said compound, represented by the formula I, is used by selecting one or more compounds from the following groups:

bis(cyclopentadienyl)-bis(thienyl)titanium, bis(cyclopentadienyl)-bis(4-methyl thienyl)titanium, bis(cyclopentadienyl)-bis(3-methyl thienyl)titanium, bis(cyclopentadienyl)-bis(2,4-dimethyl)thienyl)titanium, bis(cyclopentadienyl)-bis(4-ethyl thienyl)titanium, bis(cyclopentadienyl)-bis(3-ethyl thienyl)titanium and bis(cyclopentadienyl)-bis(2,4-diethylthienyl)titanium.

3. A process according to claim 1, wherein said catalyst is addition in the range of 0.05 to 5.0 mmol per 100 g of polymer.

4. A process according to claim 1, wherein said hydrogenation is performed at 0 to 150° C., and 1 to 100 kg.f/cm² of pressure of hydrogen.

5. A process according to claim 1, wherein a homopolymer of said conjugated diene monomer, or a copolymer consisting of conjugated diene monomer and aromatic vinyl monomer has the number-average molecuar weight of 500 to 1,000,000.

6. A process according to claim 1, wherein said conjugated diene polymer is employed by selecting butadiene or isoprene individually or as a mixed form, while aromatic vinyl monomer is employed by selecting styrene or alpha-methyl styrene.

7. A process according to claim 5, wherein said conjugated diene polymer is employed by selecting butadiene or isoprene individually or as a mixed form, while aromatic vinyl monomer is employed by selecting styrene or alpha-methyl styrene.

* * * * *